J. F. & H. E. SIPE.
RESILIENT WHEEL.
APPLICATION FILED MAR. 19, 1913.

1,132,492.

Patented Mar. 16, 1915.

WITNESSES
John O. Gumpler
George Schlatt.

INVENTORS
John F. Sipe
Harry E. Sipe
BY
Kenyon & Kenyon
ATTORNEYS

UNITED STATES PATENT OFFICE.

JOHN F. SIPE AND HARRY E. SIPE, OF NEW YORK, N. Y.

RESILIENT WHEEL.

1,132,492.  Specification of Letters Patent.  Patented Mar. 16, 1915.

Application filed March 19, 1913. Serial No. 755,282.

*To all whom it may concern:*

Be it known that we, JOHN F. SIPE and HARRY E. SIPE, citizens of the United States, and residents of New York city, in the county and State of New York, have invented certain new and useful Improvements in Resilient Wheels, of which the following is a specification.

Our invention relates to improvements in resilient wheels.

The general object of the invention is to provide an improved construction of resilient wheel and especially a spring wheel which will be simple, efficient and economical in construction and operation, and which will serve not only as an efficient substitute for wheels cushioned with pneumatic tires for all uses, but which is in many respects better.

Further and more specific objects, features and advantages will more clearly appear from the detailed description given below taken in connection with the accompanying sheet of drawings which forms a part of this specification.

Figure 1:
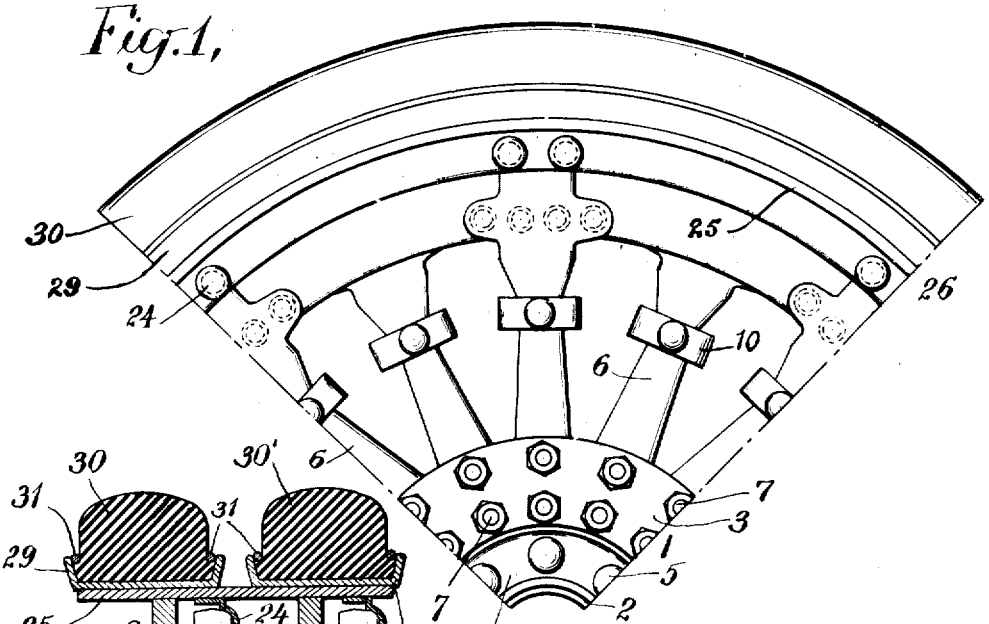
Figure 2:
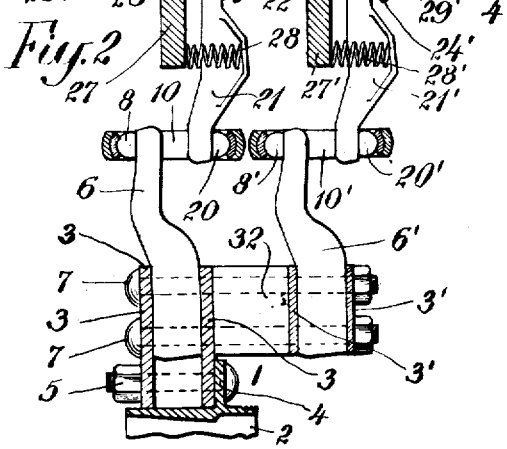
Figure 3:
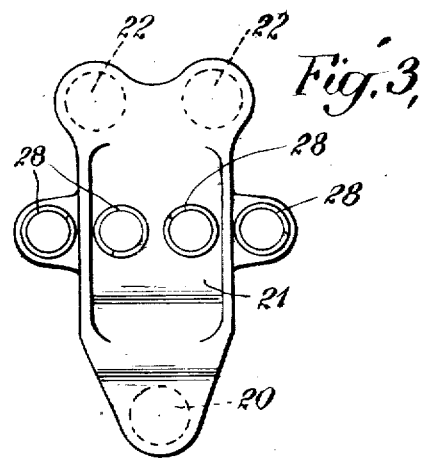
Figure 4:
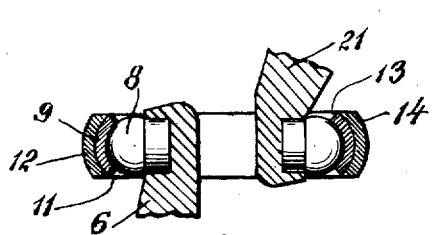

In the drawings, Figure 1 is a side view of part of a wheel embodying our improvements in the preferred form thereof; Fig. 2 is a transverse section of the same showing one set of connecting devices; Fig. 3 is an enlarged plan view of one of the levers; Fig. 4 is an enlarged section through the universal connections; and Fig. 5 is an enlarged plan view of one of the supporting connecting members.

Referring to the drawings, 1 represents a hub section with a hub 2 having surrounding peripheral flanges 3 and an integral peripheral flange 4. Between the flanges 3 are placed arms 6, and the flanges 3 are bolted together and to the flange 4 by bolts 5. Bolts 7 also pass through the flanges 3 and arms 6 to more securely hold the parts together. The arms 6 have attached thereto balls 8 which operate in sockets 9 in supporting connecting link members 10. The link members 10 are composed of four U-shaped members 11, 12, 13 and 14 (see Figs. 4 and 5).

Figure 5:
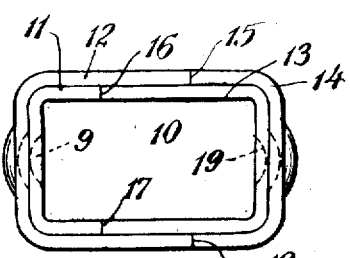

The members 11 and 13 are nested within the members 12 and 14, respectively, and the arms are of varying lengths so that the joints 15, 16, 17 and 18 are offset, as clearly shown in Fig. 5, whereby a large surface is presented between joints 15 and 16 and between 17 and 18, at which the member 12 may be welded to the member 13. The members 12 and 11 and 14 and 13 are also welded together near their respective ends so that a loop is formed with a socket or universal joint in each end thereof. Opposite the socket 9 the link member 10 is provided with a socket 19 adapted to engage a ball 20 carried upon the lower end of the lever 21. The lever 21 at its upper end, is provided with two ball projections 22 (see Fig. 3) which engage sockets 24 carried rigidly upon a circumferential band 25 of the tread section 26. The band 25 is also provided with a circumferential flange 27, and interposed between the flange 27 and each of the levers 21, midway between the balls 20 and 22 are four spiral springs 28. Carried upon the band 25 is a peripheral channel 29 adapted to contain a solid rubber tread 30, held therein by means of wires 31.

Upon any force being exerted which tends to move the hub section relatively to the tread section the links 10 change their position with respect to the axis of the wheel, thereby throwing the levers 21 so as to compress the springs 28, thereby causing a cushioning of the hub section with respect to the tread section.

In vehicles adapted to carry very heavy loads, it is desirable that the width of the tread section be increased for the purpose of increasing the strength and decreasing the wear and tear of the parts and their liability to breakage. For this purpose the band 25 is double the width necessary to carry the tread 30, and is provided with an additional peripheral channel 29' carrying an additional hard rubber tread 30'. The band 25 also carries an additional inner flange 27' and sockets 24'. Also, additional levers 21' are provided, with balls engaging the sockets 24' at their upper ends, and a ball 20' at their lower ends engaging sockets in links 10', the levers 21' being adapted to compress springs 28'. 3'—3' represent additional circular members carrying between them arms 6', the parts 3'—3' and 6' being separated from the members 3, 6 and 3, by means of a spacing block 32, and all of these parts being rigidly held together by means of the bolts 7. The arms 6' are provided on their outer ends with balls 8' adapted to engage sockets in the links 10'. Thus there is shown in Fig. 2 a double tread section with sets of connecting devices resiliently connecting the double tread section with the hub section, one set for each tread, the devices of each set being alternately disposed about the wheel and, each set comprising levers fulcrumed upon the double tread section by means of ball and socket joints, each adapted to compress a plurality of springs and each being connected to the hub section by means of links or supporting connecting members, by means of universal ball and socket joints. It will also be seen that there are shown four series of levers and four series of cushioning devices, i. e., two series of springs 28 and levers 21, one series on each side of flange 27, and two series of springs 28', and levers 21', one series on each side of the flange 27', but that each series occupies a different plane parallel to the plane of the wheel, whereby the wheel is capable of supporting efficiently an especially heavy load. As above explained, for connecting the two wheel sections together, two series of connecting devices, 10, etc., and 10', etc., are provided, and two series of springs 28 on one side of the central plane of the wheel and two series of springs 28' on the other side thereof.

It will be understood that alternate sets of connecting devices (see Fig. 1), embracing arms 6, connections 10, levers 21 and springs 28, and arms 6', connections 10', levers 21' and springs 28', are oppositely disposed so that there is no tendency of the hub section to move laterally to the tread section, or vice versa. When it is desired to remove any of the movable parts, it is only necessary to provide a clamp and compress the springs, when connections 10 will drop off and are easily removed, and then on removing the clamp the levers 21 will drop out together with the springs 28. It will further be noticed that the levers 21 are held on the wheel and in pivotal connection with the tread section by the compression of the springs 28 alone, and also that the links 10 are held in place by the action of the springs 28 alone, so that no screws or bolts or other fastening devices are required to hold in place any of the moving parts. By fulcruming the levers 21 to the tread section by means of two ball and socket joints, the levers are restrained from any movement in a plane parallel to the plane of the wheel, the joints are made absolutely noiseless, wear will not loosen the joints but will make them more perfect fitting, and the joints will not bind due to expansion by heat in protracted hard service.

By attaching the connections which support the balls 8 and 20 to the balls on the sides opposite the sockets in which they bear, it will be seen that the sockets are in no way mutilated, whereby the bearing area is whole and not decreased. Furthermore, by placing the balls upon the hub and tread sections and the sockets in the supporting connecting members 10, the line of pull in the connecting members always passes through the center of the sockets and the load will be distributed over the entire surface of the sockets at all times.

By fulcruming the levers upon the tread section instead of on the hub section they are nearer the periphery of the wheel, consequently they are farther apart than they would be if fulcrumed on the hub section and more room is given to each one, whereby they are more easily accessible and more easily put in place, and more of them may be used. Furthermore, the arrangement shown provides a simple and efficient combination adapted to wheels with double treads and which affords sufficient strength for carrying heavy loads where wheels with double treads are necessary.

In all forms of resilient wheels heretofore devised, the capacity in an automobile has, as far as we are aware, been limited to a few thousand pounds. In such wheels where springs were employed, this limited capacity is due, we believe, to the fact that the construction permits of only a relatively small number of springs being employed. In the wheel shown and described herein the capacity is greatly increased by employing levers, each of which operates on a plurality of springs, and by applying the levers and springs or other cushioning devices to the tread section so that they may be near the periphery of the wheel more of them may be used than in constructions heretofore employed. By increasing the width of the levers substantially continuous rows of springs set side by side and entirely around the wheel on both sides may be provided so that four such wheels would have a capacity of 28,000 lbs. By providing the double tread arrangement with the corresponding doubling of cushioning devices and connections the capacity may be increased to 56,000 lbs.

In using the phrase "supporting connecting members" we do not desire to limit ourselves to a single unitary member, as obviously any sort of connecting devices whether consisting of a single or a plurality of parts, and whether the parts are rigid with one another or not, may be used in place of the links 10, without departing from our invention in certain of its broader aspects. However, the links 10 form a simple and efficient device for supporting the two sections, with respect to one another, and also by placing the sockets in the links 10 new sockets may be easily put in place by a simple renewal of the links.

For illustration, we have shown only a double tread section, which, as hereinbefore stated, is used with vehicles adapted to carry very heavy loads, but obviously the more important features of our invention do not depend upon the number of such sections.

Although we have described our improvements in great detail and with respect to one particular form thereof, we do not desire to be limited to such details except as clearly specified in the appended claims, since many other changes and modifications may well be made without departing from the spirit and scope of our invention.

Having thus fully and clearly described our improvements, what we claim as new and desire to secure by Letters Patent, is:

1. A resilient wheel comprising a hub section and a tread section, cushioning means carried by one of the sections for cushioning said sections with respect to one another, and supporting connecting members connecting the sections together through the cushioning means by ball and socket joints, the connections supporting the balls being attached to the balls on the opposite sides of the balls from the sockets, the sockets being carried by said connecting members and the balls by the hub and tread sections.

2. A resilient wheel comprising a hub section and tread section, levers fulcrumed on the tread section, supporting connecting members extending substantially parallel with the axis of the wheel, each for connecting the hub section with one end of said levers, and cushioning devices adapted to be compressed by said levers due to a relative movement of said two sections.

3. A resilient wheel comprising a hub section and tread section relatively movable with respect thereto, levers fulcrumed on one of said sections, supporting connecting members extending substantially parallel with the axis of the wheel for connecting the other section with said levers by ball and socket joints to operate the levers upon a relative movement of the two sections, the connections supporting the balls being attached to the balls on the opposite side of the balls from the sockets, and the sockets being carried by the connecting members and the balls by the levers and opposite wheel section, and springs adapted to be compressed by said levers.

4. A resilient wheel comprising a hub section and a tread section relatively movable with respect to one another, levers pivoted on the tread section, cushioning devices adapted to be operated by said levers and supporting connecting members extending substantially parallel with the axis of the wheel for connecting said levers with the other section, whereby a relative movement of the two sections causes the two to be cushioned by the cushioning devices.

5. A resilient wheel comprising a hub section and tread section, levers carried by one section, cushioning devices acted upon by said levers, and connecting members extending transversely of the wheel and connecting the levers with the other section by ball and socket joints, so that a relative movement of one section with respect to the other will compress the cushioning means, the connections supporting the balls being attached to the balls on the opposite side of the balls from the sockets, the sockets being carried by the connecting members and the balls by the hub and tread sections, whereby the line of pull at all times passes substantially through the center of the sockets, and the cushioning devices being at a less distance from the fulcrum of the levers than the connecting members, whereby a relatively large movement of the sections with respect to one another may take place as compared with the amount of compression of the cushioning means.

6. A resilient wheel comprising a hub section and tread section, levers fulcrumed on one section, cushioning devices acted upon by said levers and connecting members extending substantially parallel with the axis of the wheel for connecting said levers with the other section, whereby a relative movement of the sections will operate the levers to act upon the cushion devices, said levers being held on the wheel by the pressure of the cushioning means alone.

7. A resilient wheel comprising a hub section and tread section, cushioning means for cushioning said section with respect to one another, and supporting connecting members extending approximately parallel with the axis of the wheel for connecting the sections together by ball and socket joints, the connections supporting the balls being attached to the balls on the opposite side of the balls from the sockets, and the sockets being carried by the connecting members and the balls by the hub and tread sections, whereby the line of pull at all times passes substantially through the center of the sockets.

8. A resilient wheel comprising a hub section and tread section relatively movable with respect thereto, levers fulcrumed on one of said sections, supporting connecting members extending substantially parallel with the axis of the wheel for connecting with the other section with said levers by ball and socket joints to operate the levers upon a relative movement of the two sections, the connections supporting the balls being attached to the balls on the opposite side of the balls from the sockets, and the sockets being carried by the connecting members and the balls by the levers and opposite wheel section, and springs adapted to be compressed by said levers, the levers and springs being alternately disposed about the wheel.

9. A resilient wheel comprising a double tread section, a hub section cushioned with respect thereto, a plurality of sets of connecting devices, the devices of each set being alternately disposed about the wheel for operatively connecting the hub section to the tread section, each set comprising supporting connecting members operatively connecting the sections by ball and socket joints, the balls being carried by the sections and the sockets by the connecting members, and the connections supporting the balls being attached to the balls on the opposite side of the balls from the sockets.

10. A resilient wheel comprising a double tread section, a hub section relatively movable with respect thereto, a plurality of sets of connecting devices, the devices of each set being alternately disposed about the wheel for operatively connecting the hub section to the tread section, each set comprising levers fulcrumed on one section, cushioning devices adapted to be operated by said levers, and supporting connecting members extending substantially parallel with the axis of the wheel, one for each lever, for connecting the levers with the other section, said supporting connecting members being connected to the levers and said other section by universal ball and socket joints, the balls being carried by the levers and said other section, and the sockets by the connecting members, and the connections supporting the balls being attached to the balls on the opposite side of the balls from the sockets.

11. A resilient wheel comprising a hub section and a tread section relatively movable with respect thereto, levers, each fulcrumed on one section by two ball and socket connections, cushioning devices operated by said levers, and supporting connecting members extending substantially parallel with the axis of the wheel for connecting said levers with the other section by universal joints.

12. A resilient wheel comprising a hub section and a tread section relatively movable with respect thereto, levers, each fulcrumed on one section by two ball and socket connections, a plurality of springs adapted to be compressed by each lever, and supporting connecting members extending substantially parallel with the axis of the wheel for connecting said levers with the other section by ball and socket universal joints, the sockets being carried by the connecting members and the connections supporting the balls being attached to the balls on the opposite side of the balls from the sockets.

13. A resilient wheel comprising a hub section and a tread section relatively movable with respect to one another, a plurality of levers fulcrumed on the tread section and supporting connecting members extending substantially parallel to the axis of the wheel for connecting said levers to the hub section through universal joints, and a plurality of coil springs adapted to be simultaneously compressed by each lever upon the taking place of a relative movement between said sections.

14. A resilient wheel comprising a hub section and a tread section, cushioning means for cushioning said sections with respect to one another, and supporting connecting members connecting the sections together through ball and socket universal joints, each of said connecting members being formed of two or more U-shaped members connected together to form a loop with a universal joint at each end thereof.

15. A resilient wheel comprising a hub section and a tread section, cushioning means for cushioning said sections with respect to one another, and supporting connecting members connecting the sections together through ball and socket universal joints, each of said connecting members being formed of two or more members connected together to form a loop having a socket in each end thereof.

16. A resilient wheel comprising a hub section and a tread section cushioned with respect to one another, levers fulcrumed on one section, cushioning devices operated by said levers, and two series of supporting connecting members extending substantially parallel with the axis of the wheel, each for connecting the levers to the other section, the members of each series alternately opposing one another, and said two series occupying different planes substantially parallel to the plane of the wheel.

17. A resilient wheel comprising a hub section and tread section relatively movable with respect to one another, four series of levers fulcrumed on one section and four series of cushioning devices adapted to be operated by said series of levers respectively, each series of levers and cushioning devices occupying a different plane substantially parallel to the plane of the wheel, and two series of supporting connecting members connecting the levers with the other section through universal joints.

18. In a resilient wheel, the combination of a hub section and a tread section, radially arranged levers fulcrumed thereon, springs adapted to be compressed by a movement of the levers in a plane substantially parallel to the axis of the wheel, and connecting members extending substantially parallel to the axis of the wheel for connecting each lever with the section on which it is not fulcrumed by means of ball and socket joints, the sockets being carried by the said connecting members to engage balls on the levers and wheel section, and the balls being supported on their sides opposite their sockets.

19. In a resilient wheel, the combination of a hub section and a tread section, levers fulcrumed thereon, springs adapted to be compressed by a movement of the levers in a plane substantially parallel to the axis of the wheel, and connecting members extending substantially parallel to the axis of the wheel for connecting each lever with the section on which it is not fulcrumed by means of ball and socket joints, the sockets being carried by the said connecting members to engage balls on the levers and wheel sections.

In testimony whereof we have signed our names to this specification in the presence of two subscribing witnesses.

JOHN F. SIPE.
HARRY E. SIPE.

Witnesses:
  EDWIN SEGER,
  GORHAM CROSBY.

It is hereby certified that in Letters Patent No. 1,132,492, granted March 16, 1915, upon the application of John F. Sipe and Harry E. Sipe, of New York, N. Y., for an improvement in "Resilient Wheels," an error appears in the printed specification requiring correction as follows: Page 4, line 123, after the word "member" insert the words *extending substantially parallel with the axis of the wheel, each for;* and that the said Letters Patent should be read with this correction therein that the same may conform to the record of the case in the Patent Office.

Signed and sealed this 4th day of May, A. D., 1915.

[SEAL.]

R. F. WHITEHEAD,
*Acting Commissioner of Patents.*